(12) United States Patent
Little

(10) Patent No.: US 9,135,090 B2
(45) Date of Patent: Sep. 15, 2015

(54) MESSAGING BUS RESIDING ON A MOBILE DEVICE

(71) Applicant: Red Hat, Inc., Raleigh, NC (US)

(72) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 123 days.

(21) Appl. No.: 13/777,420

(22) Filed: Feb. 26, 2013

(65) Prior Publication Data

US 2014/0245322 A1 Aug. 28, 2014

(51) Int. Cl.
*G06F 9/54* (2006.01)

(52) U.S. Cl.
CPC ...................... *G06F 9/541* (2013.01)

(58) Field of Classification Search
CPC ....... G06F 9/54; G06F 9/541; H04N 21/4126; G06Q 30/0267
See application file for complete search history.

(56) References Cited

U.S. PATENT DOCUMENTS

| 8,868,757 | B1 * | 10/2014 | Liu et al. | 709/227 |
| 2011/0029988 | A1 * | 2/2011 | Mittal et al. | 719/314 |
| 2012/0117534 | A1 * | 5/2012 | Hershenson et al. | 717/105 |
| 2014/0157113 | A1 * | 6/2014 | Krishna et al. | 715/249 |
| 2014/0188980 | A1 * | 7/2014 | Longhenry et al. | 709/203 |

* cited by examiner

*Primary Examiner* — H S Sough
*Assistant Examiner* — Syed Roni
(74) *Attorney, Agent, or Firm* — Haynes and Boone, LLP

(57) ABSTRACT

Systems and methods are disclosed for handling messages using a messaging bus residing on a mobile device. An example system includes a register module that registers first and second applications. The second application is executing on the mobile device. The system also includes a routing module that receives from the first application a communication in a first format for the second application, determines a second format associated with the second application, and determines whether the first format is different from the second format. When the first format is determined to be different from the second format, the routing module transmits to the second application the communication in the second format. The system further includes a translation module that when the first format is determined to be different from the second format, translates the communication in the first format to the second format.

18 Claims, 4 Drawing Sheets

MESSAGING BUS RESIDING ON A MOBILE DEVICE

BACKGROUND

The present disclosure generally relates to a messaging bus, and more particularly to a messaging bus residing on a mobile device.

Service Oriented Architecture (SOA) is a popular architectural paradigm for the development of software applications. For example, Web services provide the SOA to other applications via industry standard networks, interfaces, and protocols. The SOA is based on loosely-coupled and standards-based architectures. It is an approach to distributed computing that allows networked software resources to be leveraged.

The SOA enables enterprises to integrate services, handle business events, and automate business processes more efficiently. For example, an SOA links information technology resources, data, services, and applications. The SOA can include an enterprise service bus (ESB). An ESB may be an event-driven and standards-based messaging engine that provides services for complex architectures. The ESB provides infrastructure that links together services and clients to enable distributed applications and processes. The ESB typically provides a service to a client using a service deployed on an ESB server at runtime.

BRIEF SUMMARY

This disclosure relates to a messaging bus that resides on a mobile device and enables an application executing on the mobile device to communicate with another application via the messaging bus. Methods, systems, and techniques for enabling the application executing on the mobile device to communicate with one or more applications are provided.

According to an embodiment, a system for handling messages using a messaging bus residing on a mobile device includes a register module that registers a first application and a second application and stores in a registry first registration information associated with the first application and second registration information associated with the second application. The second application is executing on the mobile device. The system also includes a routing module and a translation module residing on the mobile device. The routing module receives from the first application a communication in a first format for the second application, determines a second format associated with the second application, and determines whether the first format is different from the second format. When the first format is determined to be different from the second format, the translation module translates the communication in the first format to the second format. When the first format is determined to be different from the second format, the routing module transmits to the second application the communication in the second format.

According to another embodiment, a method of handling messages using a messaging bus residing on a mobile device includes registering via a messaging bus a first application. The messaging bus resides on a mobile device. The method also includes registering via the messaging bus a second application executing on the mobile device. The method further includes receiving from the first application via the messaging bus a communication in a first format for the second application. The method also includes determining via the messaging bus a second format associated with the second application. The method further includes determining via the messaging bus whether the first format is different from the second format. The method also includes when the first format is determined to be different from the second format, translating via the messaging bus the communication in the first format to the second format. The method further includes after the translation, transmitting to the second application via the messaging bus the communication in the second format.

According to another embodiment, a non-transitory machine-readable medium includes a plurality of machine-readable instructions that when executed by one or more processors are adapted to cause the one or more processors to perform a method including registering a first application, the messaging bus residing on a mobile device; registering a second application executing on the mobile device; receiving from the first application a communication in a first format for the second application; determining a second format associated with the second application; determining whether the first format is different from the second format; when the first format is determined to be different from the second format, translating the communication in the first format to the second format; and after the translating, transmitting to the second application the communication in the second format.

This disclosure provides techniques for enabling an application executing on the mobile device to communicate with another application via a messaging bus.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architectures
  A. Mobile Application Communicating With Another Mobile Application
    1. Registration Information
    2. Communication Between Applications
    3. Compatible Formats
  B. Mobile Application Communicating With a Remote Application
  C. Content Based Routing
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

An ESB may provide infrastructure that links together services and clients to enable distributed applications and processes. For example, an ESB may include one or more busses that logically interconnect available services and clients. The ESB typically provides a service to a client using a service deployed on an ESB server at runtime. For example, an ESB may be deployed to an application server and then services are deployed to the ESB. The ESB is typically used for client-server interactions and has not been deployed to a mobile device.

A mobile device may have capabilities only marginally inferior to contemporary fixed devices. Mobile devices have become powerful, and a number of applications have become available for mobile devices. For example, mobile devices may be used for gaming, web browsing, calendars, and e-mail.

A mobile application may refer to an application executing on the mobile device. Typically, two mobile applications may communicate with each other if they know about each other and have been programmed to communicate directly with each other before being deployed onto the mobile device. With the plethora of applications made available, a mobile application may be unable to natively understand another application. It may be beneficial to provide a translation service for a mobile application to communicate with other applications without concern for the formats accepted by the other applications.

This disclosure describes providing a messaging bus on the mobile device to enable the mobile application to communicate with one or more applications. The messaging bus abstracts details from the mobile application so that it may use its native format to communicate with another application via the messaging bus.

II. Example System Architectures

A. Mobile Application Communicating with Another Mobile Application

Figure 1:
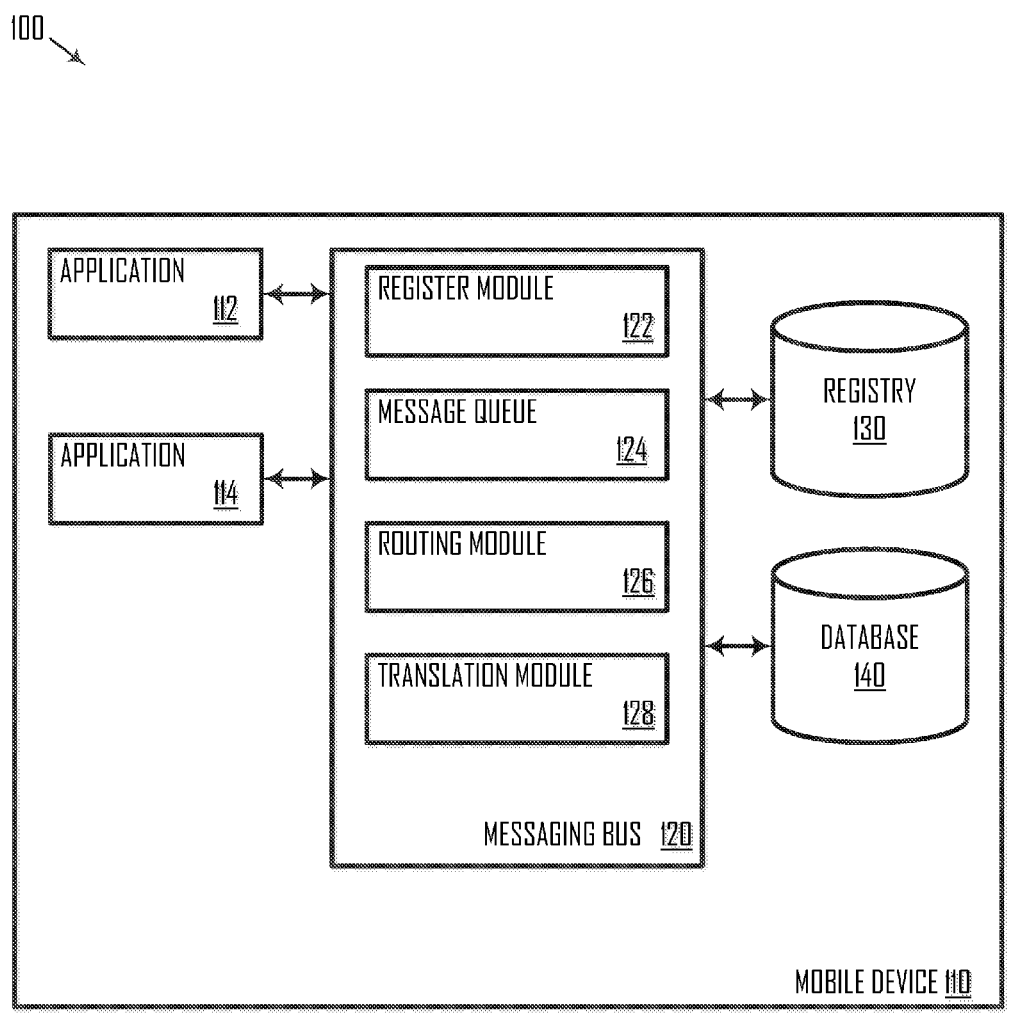
FIG. 1 is a simplified block diagram illustrating a system for handling messages using a messaging bus residing on a mobile device, according to an embodiment.

FIG. 1 is a simplified block diagram 100 illustrating a system for handling messages using a messaging bus residing on a mobile device, according to an embodiment. Diagram 100 includes a mobile device 110. Mobile device 110 may refer to a non-stationary computing device. Mobile device 110 may be, for example, a mobile phone, tablet, sensor (e.g., radio frequency identification device chip), or smart card.

Mobile device 110 includes applications 112 and 114, messaging bus 120, registry 130, and database 140. Messaging bus 120 may provide the capabilities of message handling, data transformation, content-based routing, and message repositories. Messaging bus 120 may allow software components to find and invoke each other irrespective of the technology used in their implementations. In an embodiment, messaging bus 120 is an enterprise service bus.

Messaging bus 120 includes a register module 122, message queue 124, routing module 126, and translation module 128. In an embodiment, each of register module 122, message queue 124, routing module 126, and translation module 128 resides on mobile device 110.

1. Registration Information

In an embodiment, register module 122 registers one or more applications and stores the registration information associated with the one or more registered applications in registry 130. Registry 130 may be used to store endpoint references for the services deployed within messaging bus 120. In an embodiment, clients and services bind to messaging bus 120 and perform all interactions through messaging bus 120.

The following is a description of application 112. This description applies as well to application 114. Application 112 may be a client application executing on mobile device 110. In an example, when application 112 is installed on mobile device 110, register module 122 registers application 112 with messaging bus 120. In an example, register module 122 may detect the installation of application 112 and send a request for registration information to application 112 based on the detection. Application 112 may publish itself into registry 130 along with one or more formats accepted by application 112. The registration information of application 112 may include at least one of a set of protocols accepted by application 112, a set of data formats accepted by application 112, and a set of content based routing policies associated with application 112. Register module 122 may store the registration information associated with application 112 in registry 130.

2. Communication Between Applications

Messaging bus 120 may mediate communication between endpoint references. A communication may be addressed to a destination endpoint reference (e.g. application 112 or application 114). In an example, the endpoint references of a communication are applications 112 and 114. Applications 112 and 114 may indirectly communicate with each other via messaging bus 120. In an example, routing module 126 routes one or more messages between applications 112 and 114. Messaging bus 120 may be transparent such that applications 112 and 114 believe that they are communicating directly with each other and are unaware of messaging bus 120. In an embodiment, all communications between applications 112 and 114 pass through routing module 126.

Messaging bus 120 may receive one or more communications from application 112 for application 114 and route the one or more communications to application 114. Similarly, messaging bus 120 may receive one or more communications from application 114 for application 112 and route the one or more communications to application 112. The communications may be placed in message queue 124 for routing by routing module 126. Message queue 124 may be a buffering component that assists an application executing on mobile device 110 to communicate with one or more applications that differ in communication speed. Additionally, if routing module 126 is not processing each communication fast enough, some of the communications may be lost. Message queue 124 may assist in mitigating the loss of communications.

Messaging bus 120 may cache data on mobile device 110 so that applications may gain the benefit of locally sharing data. In an embodiment, messaging bus 120 stores the cached data into database 140.

3. Compatible Formats

Routing module 126 may receive from application 114 a communication in a first format for application 112. In an example, the communication specifies application 112 as the destination endpoint reference. Routing module 126 may determine a second format associated with application 112. In an example, routing module 126 may determine the second format associated with application 112 by searching registry 130. Routing module 126 may determine whether the first format is different from the second format.

Translation module 128 may translate a communication between applications 112 and 114 into another format. In an example, when routing module 126 determines that the first format is different from the second format, translation module 128 translates a communication in the first format to the second format. Routing module 126 may then transmit to application 114 the communication in the second format. Alternatively, when routing module 126 determines that the first format is not different from the second format, routing module 126 transmits to application 114 the communication in the first format.

In an example, the first and second formats are associated with a protocol. Registry 130 may include a set of protocols accepted by application 112 and a set of protocols accepted by application 114. Routing module 126 may determine a format associated with application 112 by searching registry 130. If registry 130 does not include the set of protocols accepted by application 112, register module 122 may request this information from application 112. Similarly, if registry 130 does not include the set of protocols accepted by application 114, register module 122 may request this information from application 114.

The communication in the first format may be based on a first protocol associated with application 114, and routing module 126 may determine whether application 112 accepts the first protocol. When routing module 126 determines that application 112 does not accept the first protocol, routing module 126 may determine a second protocol that is accepted by application 112 and translation module 128 may translate the communication based on the first protocol to the communication based on the second protocol. Routing module 126 may then transmit to application 112 a communication based on the second protocol. Application 112 may receive the communication based on the second protocol and understand the communication.

The protocol may be, for example, a network protocol such as file transfer protocol (FTP) or hypertext transfer protocol (HTTP). If application 114 sends to application 112 a communication based on FTP and application 112 only accepts HTTP, translation module 128 may translate the communication based on FTP to a communication based on HTTP. Routing module 126 may then transmit to application 112 the communication based on HTTP. In this way, applications 112 and 114 may communicate even though the network protocol used by each is different.

In another example, the first and second formats are associated with a data format. Registry 130 may include a set of data formats accepted by application 112 and a set of data formats accepted by application 114. Routing module 126 may determine a data format associated with application 112 by searching registry 130. If registry 130 does not include the set of data formats accepted by application 112, register module 122 may request this information from application 112. Similarly, if registry 130 does not include the set of data formats accepted by application 114, register module 122 may request this information from application 114. The communication in the first data format may be based on a first data format associated with application 114, and routing module 126 may determine whether application 112 accepts the first data format. When routing module 126 determines that application 112 does not accept the first data format, routing module 126 may determine a second data format that is accepted by application 112 and translation module 128 may translate the communication based on the first data format to the communication based on the second data format. Routing module 126 may then transmit to application 112 a communication based on the second data format. Application 112 may receive the communication based on the second data format and understand the communication.

The data format may be, for example, Microsoft® Word and OpenOffice®. If application 114 sends to application 112 a Microsoft® Word document and application 112 only accepts OpenOffice® documents, translation module 128 may translate the Microsoft® Word document to an OpenOffice® document. Routing module 126 may then transmit to application 112 the OpenOffice® document. Application 112 may receive the communication in OpenOffice® format and be able to open the OpenOffice® document. In this way, applications 112 and 114 may communicate even though the data format used by each is different. Trademarks are the property of their respective owners.

Application 112 may respond to the communication from application 114. In an example, in response to the transmitted communication, routing module 122 receives from application 112 a second communication in a format (e.g., second format) associated with application 112. When the format associated with application 112 is determined to be different from a format associated with application 114, translation module 128 may translate the second communication in the format associated with application 112 to the format associated with application 114. Routing module 126 may then transmit to application 114 the second communication in the format associated with application 114. Alternatively, when routing module 126 determines that the format associated with application 112 is not different from the format associated with application 114, routing module 126 transmits to application 114 the communication in the format associated with application 112.

In FIG. 1, messaging bus 120 may enable applications 112 and 114 to communicate even if they do not natively understand each other. As discussed above and further emphasized here, FIG. 1 is merely an example, which should not unduly limit the scope of the claims. For example, although block diagram 100 is described herein with reference to two applications executing on mobile device 110, fewer than or more than two applications may execute on mobile device 110 without departing from the spirit and scope of this disclosure.

Further, it should be understood that one or more modules (e.g., register module 122, routing module 126, and translation module 128) may be combined with another module. In an example, routing module 126 and translation module 128 are combined into one module. It should also be understood that a module may be separated into more than one module. In an example, translation module 128 is split into a protocol translation module that translates communications based on different protocols and a data format translation module that translates communications based on different data formats. Further, for simplicity, applications 112 and 114 are described as being associated with a protocol or a data format. Each of applications 112 and 114 may, however, be associated with more than one protocol and/or data format.

Moreover, in FIG. 1, application 114 is shown as executing on mobile device 110, and messaging bus 120 may be useful for application-to-application communication on mobile device 110. Messaging bus 120 may enable the communications between applications 112 and 114 to occur without the communications leaving mobile device 110.

B. Mobile Application Communicating With a Remote Application

Messaging bus 120 may also enable an application executing on mobile device 110 to communicate with an application executing on a device remote from mobile device 110. An application may refer to a service remote from the mobile device.

Figure 2:
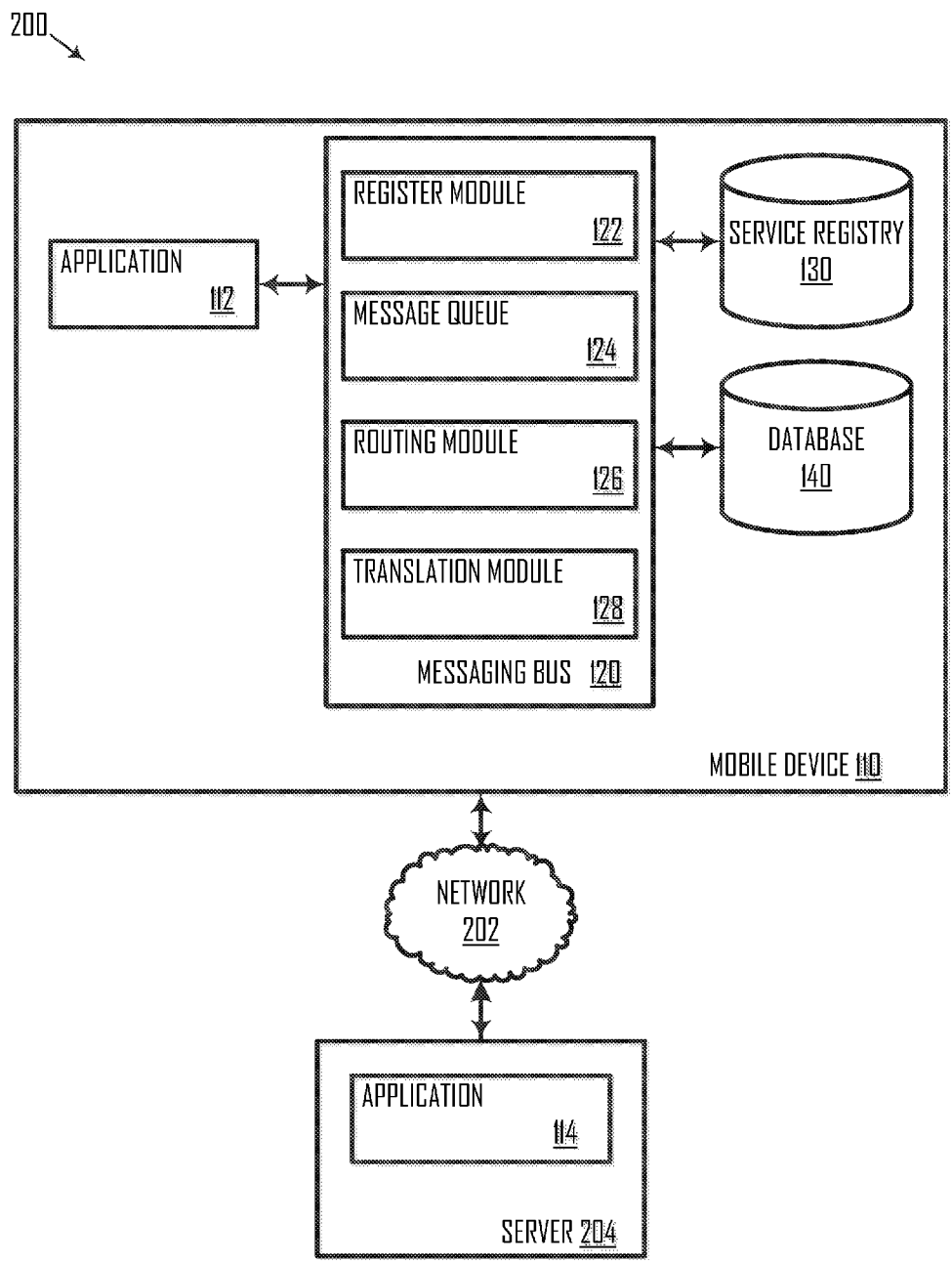
FIG. 2 is a simplified block diagram illustrating another system for handling messages using a messaging bus residing on a mobile device, according to an embodiment.

FIG. 2 is a simplified block diagram 200 illustrating another system for handling messages using a messaging bus residing on a mobile device, according to an embodiment. Diagram 200 includes mobile device 110 coupled to a network 202. Mobile device 110 includes application 112, messaging bus 120, registry 130, and database 140. Diagram 200 also includes a server 204 coupled to network 202. Mobile device 110 and server 204 may communicate with each other via network 202. In an embodiment, messaging bus 120 receives replicated data and stores the replicated data into database 140.

Network 202 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

In FIG. 2, application 114 is executing on a device remote from mobile device 110. Applications 112 and 114 may send communications to each other over network 202, and messaging bus 120 may mediate communication between these endpoint references.

In an example, routing module 126 receives communications from application 114 for application 112 over network 202. The communications from application 114 for application 112 may specify application 112 as a destination endpoint reference. Similarly, routing module 126 transmits communications from application 112 for application 114 over network 204. The communications from application 112 for application 114 may specify application 114 as a destination endpoint reference.

C. Content Based Routing

As discussed, messaging bus 120 may mediate communication between endpoint references. Although a communication may be addressed to a destination endpoint reference, the communication may fail to arrive at the specified endpoint reference for various reasons. In an example, the specified destination address may no longer be valid because the destination address has been removed or changed.

To address these problems, messaging bus 120 may provide content based routing to route communications based on the content of the communications rather than the endpoint reference specified in the communication. In an embodiment, routing module 126 views the communication and applies a set of rules to the content of the communication to determine the parties interested in its content. This can relieve an application that sends a communication to another application from having to know the final destination endpoint reference of the communication.

Registry 130 may include a set of content based routing policies associated with application 112. In an example, routing module 126 receives from application 112 a communication specifying application 114 as the destination endpoint reference. When a condition is satisfied, routing module 126 may determine a destination endpoint reference different from application 114 based on the set of content based routing policies. In an example, a routing policy may specify that communications that specify application 114, residing in a server in London, as a destination endpoint reference and that are received during business hours in the United States should be rerouted to a backup service running in New York City. In this example, if the conditions are satisfied, routing module 126 determines the appropriate destination endpoint reference in New York City and transmits to the backup service running in New York City the communication from application 112. When the condition is not satisfied, routing module 126 may transmit to application 114 the communication from application 112.

Routing module 126 may include additional routing information in registry 130. For example, applications 112 and 114 may communicate via HTTP, and at a later point in time, application 114 may communicate via FTP instead of HTTP. Application 114 may send a communication to messaging bus 120 indicating that application 114 communicates via FTP and no longer communicates via HTTP. Routing module 126 may also store this information in registry 130. In response to the communication from application 114, messaging bus 120 may translate any communication for application 114 to a communication based on FTP. Routing module 126 may then transmit the communication based on FTP to application 114. In this way, it may be unnecessary for application 112 to be aware of changes to protocols or data formats associated with a destination endpoint reference. Messaging bus 120 may handle these messages appropriately.

III. Example Method

Figure 3:
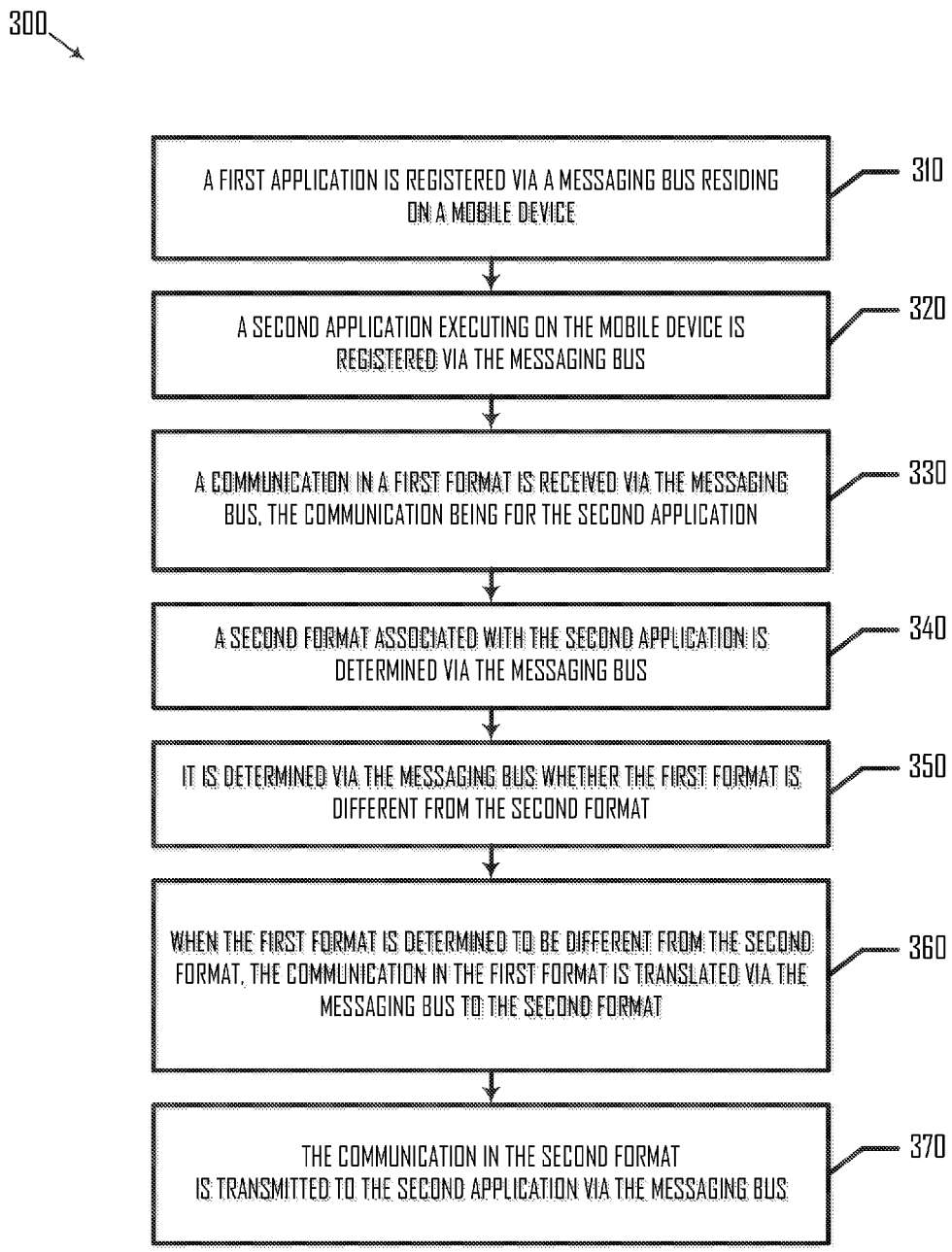
FIG. 3 is a simplified flowchart illustrating a method of handling messages using a messaging bus residing on a mobile device, according to an embodiment.

FIG. 3 is a simplified flowchart illustrating a method 300 of handling messages using a messaging bus residing on a mobile device, according to an embodiment. Method 300 is not meant to be limiting and may be used in other applications.

Method 300 includes steps 310-370. In a step 310, a first application is registered via a messaging bus residing on a mobile device. In an example, register module 122 registers application 114 via messaging bus 120 residing on mobile device 110.

In a step 320, a second application executing on the mobile device is registered via the messaging bus. In an example, register module 122 registers application 112 executing on the mobile device via messaging bus 120.

In a step 330, a communication in a first format is received via the messaging bus, the communication being for the second application. In an example, routing module 126 receives from application 114 via messaging bus 120 a communication in a first format for application 112.

In a step 340, a second format associated with the second application is determined via the messaging bus. In an example, routing module 126 determines via messaging bus 120 a second format associated with application 112.

In a step 350, it is determined via the messaging bus whether the first format is different from the second format. In an example, routing module 126 determines via messaging bus 120 whether the first format is different from the second format.

In a step 360, when the first format is determined to be different from the second format, the communication in the first format is translated via the messaging bus to the second format. In an example, when the first format is determined to be different from the second format, translation module 128 translates via messaging bus 120 the communication in the first format to the second format.

In a step 370, the communication in the second format is transmitted to the second application via the messaging bus. In an example, routing module 126 transmits to application 112 via messaging bus 120 the communication in the second format.

It is also understood that additional method steps may be performed before, during, or after steps 310-370 discussed above. For example, method 300 may include a step of searching the registry that includes the registration information. It is also understood that one or more of the steps of method 300 described herein may be omitted, combined, or performed in a different sequence as desired.

IV. Example Computing System

Figure 4:
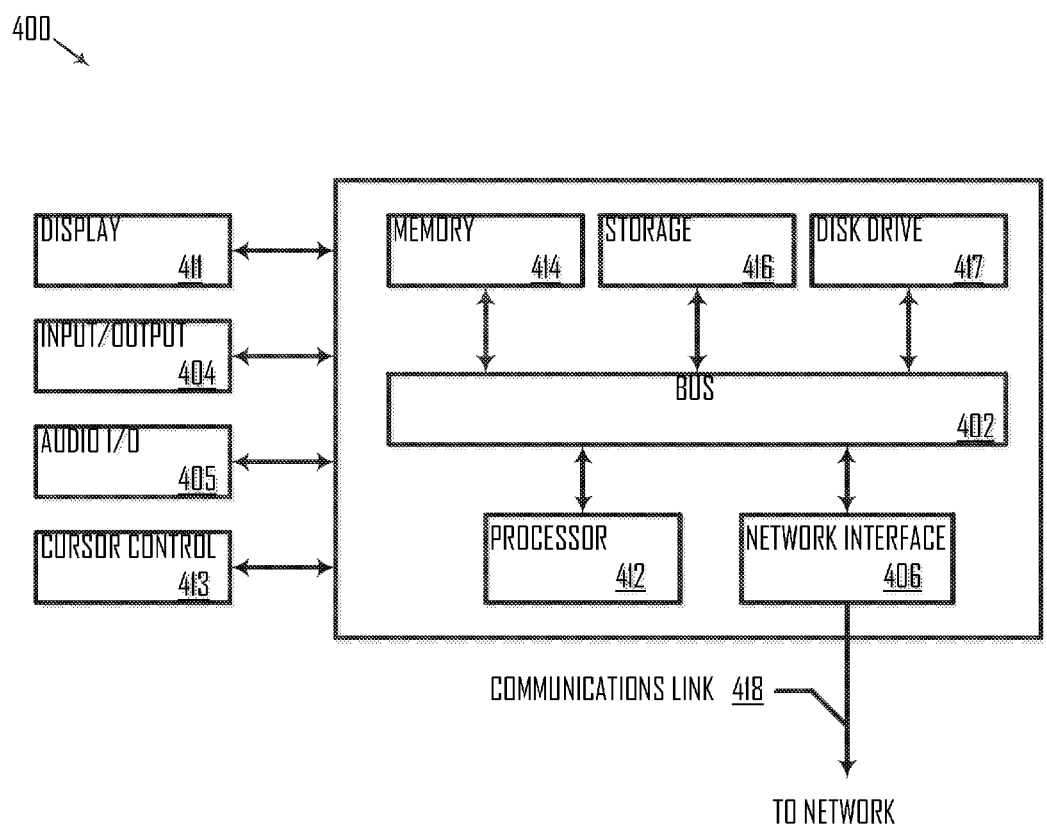
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, host machine 101 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. A processor 412, which may be a micro-controller, digital signal processor (DSP), or other processing component, processes these various signals, such as for display on computer system 400 or transmission to other devices via communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A system for handling messages using a messaging bus residing on a mobile device, the system comprising:
    a register module, residing on a mobile device, that registers a first application and a second application and stores first registration information associated with the first application and second registration information associated with the second application in a registry, wherein the second application is executing on the mobile device, wherein the first registration information includes a set of content based routing policies associated with the first application;

a routing module, residing on the mobile device, that receives from the first application a communication in a first format for the second application, determines a second format associated with the second application, determines whether the first format is different from the second format, and when the first format is determined to be different from the second format, transmits the communication in the second format to the second application; and a translation module, residing on the mobile device, that when the first format is determined to be different from the second format, translates the communication in the first format to the second format, wherein when a condition is satisfied, the routing module determines a destination endpoint different from the first application based on the set of content based routing policies and transmits a second communication to the destination endpoint, and when the condition is not satisfied, the routing module transmits the second communication to the first application.

2. The system of claim 1, wherein when the first format is determined to not be different from the second format, the routing module transmits the communication in the first format to the second application.

3. The system of claim 1, wherein when the routing module determines a format associated with an application, the routing module searches the registry.

4. The system of claim 1, wherein the messaging bus is an enterprise service bus.

5. The system of claim 1, wherein in response to the transmitted communication, the routing module receives from the second application a second communication in the second format for the first application, wherein when the first format is determined to be different from the second format, the translation module translates the second communication in the second format to the first format, when the first format is determined to not be different from the second format, the routing module transmits the second communication in the second format, and when the first format is determined to be different from the second format, the routing module transmits the second communication in the first format.

6. The system of claim 5, wherein the first application is executing on a device remote from the mobile device, and the routing module receives the transmitted communication over a network and transmits the second communication over the network.

7. The system of claim 1, wherein the first application is executing on the mobile device.

8. The system of claim 1, wherein the second registration information includes at least one of a set of protocols accepted by the second application and a set of data formats accepted by the second application.

9. The system of claim 8, wherein the communication in the first format is based on a first protocol associated with the first application, and the routing module determines whether the second application accepts the first protocol, wherein when the routing module determines that the second application does not accept the first protocol, the routing module determines a second protocol that is accepted by the second application and transmits a communication based on the second protocol to the second application, and wherein when the routing module determines that the second application does not accept the first protocol, the translation module translates the communication based on the first protocol to the communication based on the second protocol.

10. The system of claim 8, wherein the communication in the first format is based on a first data format associated with the first application, and the routing module determines whether the second application accepts the first data format, wherein when the routing module determines that the second application does not accept the first data format, the routing module determines a second data format that is accepted by the second application and transmits a communication based on the second data format to the second application, and wherein when the routing module determines that the second application does not accept the first data format, the translation module translates the communication based on the first data format to the communication based on the second data format.

11. The system of claim 1, wherein all communications between the first and second applications pass through the routing module.

12. A method of handling messages using a messaging bus residing on a mobile device, the method comprising:

registering, via a messaging bus, a first application, the messaging bus executing on a mobile device, wherein registering the first application includes storing a set of content based routing policies associated with the first application into a registry;

registering via the messaging bus a second application executing on the mobile device;

receiving, via the messaging bus, a communication specifying the second application as a first destination endpoint, the communication being from the first application;

determining, based on one or more content based routing policies of the set, a second destination endpoint for the communication when a condition is satisfied, the second destination endpoint being different from the first destination endpoint;

storing first registration information including a set of content based routing policies associated with the first application;

transmitting the communication to the second destination endpoint; and transmitting the communication to the first destination endpoint, when the condition is not satisfied.

13. The method of claim 12, wherein the communication is in a first format, the method comprising:

determining, via the messaging bus, a second format associated with the second destination endpoint;

determining, via the messaging bus, whether the first format is different from the second format; and when the first format is determined to be different from the second format, translating, via the messaging bus, the communication in the first format to the second format.

14. The method of claim 13, further comprising:

in response to the transmitting, receiving from the second destination endpoint a second communication in the second format for the first application, when the first format is determined to be different from the second format, translating the second communication in the second format to the first format, after the translating, transmitting the second communication in the first format to the first application, and when the first format is determined to not be different from the second format, transmitting the second communication in the second format to the first application.

15. The method of claim 13, further comprising:
identifying a first protocol associated with the communication in the first format, the communication in the first format being based on the first protocol; and
determining whether the second application accepts the first protocol,
wherein when the second application is determined to not accept the first protocol, the determining a second format associated with the second application includes determining a second protocol that is accepted by the second application, and the translating the communication in the first format to the second format includes translating the communication based on the first protocol to a communication based on the second protocol, and the transmitting includes transmitting the communication based on the second protocol to the second application.

16. The method of claim 13, further comprising:
identifying a first data format associated with the communication in the first format; and
determining whether the second application accepts the first data format,
wherein when the second application is determined to not accept the first data format, the determining a second format associated with the second application includes determining a second data format that is accepted by the second application, and the translating the communication in the first format to the second format includes translating the communication in the first data format to the second data format, and the transmitting includes transmitting the communication based on the second data format to the second application.

17. The method of claim 12, further comprising:
transmitting a request to the second application for at least one of a set of protocols accepted by the second application and a set of data formats accepted by the second application.

18. A non-transitory machine-readable medium comprising a plurality of machine-readable instructions that when executed by one or more processors are adapted to cause the one or more processors to perform a method comprising:
registering a first application executing on a mobile device, wherein registering the first application includes storing a set of content based routing policies associated with the first application into a registry;
registering a second application executing on the mobile device;
receiving a communication specifying the second application as a first destination endpoint, the communication being from the first application;
determining, based on one or more content based routing policies of the set, a second destination endpoint for the communication when a condition is satisfied, the second destination endpoint being different from the first destination endpoint;
storing first registration information including a set of content based routing policies associated with the first application;
transmitting the communication to the second destination endpoint; and
transmitting the communication to the first destination endpoint, when the condition is not satisfied.

* * * * *